(12) United States Patent
Sato et al.

(10) Patent No.: US 11,590,902 B2
(45) Date of Patent: Feb. 28, 2023

(54) VEHICLE DISPLAY SYSTEM FOR DISPLAYING SURROUNDING EVENT INFORMATION

(71) Applicant: Toyota Jidosha Kabushiki Kaisha, Toyota (JP)

(72) Inventors: Kenji Sato, Toyota (JP); Kei Yamamoto, Toyota (JP); Takashi Nishimoto, Owariasahi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 169 days.

(21) Appl. No.: 17/108,537

(22) Filed: Dec. 1, 2020

(65) Prior Publication Data

US 2021/0170957 A1  Jun. 10, 2021

(30) Foreign Application Priority Data

Dec. 6, 2019  (JP) .............................. JP2019-221292

(51) Int. Cl.
*B60R 11/02* (2006.01)
*G02B 27/01* (2006.01)
*B60R 1/00* (2022.01)

(52) U.S. Cl.
CPC ............ *B60R 11/0229* (2013.01); *B60R 1/00* (2013.01); *G02B 27/0172* (2013.01); *B60R 2300/304* (2013.01); *B60R 2300/308* (2013.01); *B60R 2300/70* (2013.01); *B60R 2300/8053* (2013.01); *G02B 2027/014* (2013.01)

(58) Field of Classification Search
CPC ..... B60R 1/20; B60R 11/04; B60R 2300/302; B60R 2300/303; B60R 2300/304; B60R 2300/305; B60R 2300/307; B60R 2300/8053

See application file for complete search history.

(56) References Cited

U.S. PATENT DOCUMENTS

| 6,266,614 B1 * | 7/2001 | Alumbaugh ....... G01C 21/3679 |
| | | 701/516 |
| 9,286,711 B2 * | 3/2016 | Geisner .................. G06F 3/013 |
| 10,237,529 B2 * | 3/2019 | Alaniz ................. G01C 21/365 |
| 10,261,576 B2 * | 4/2019 | Alaniz ....................... B60R 1/00 |
| 10,451,435 B2 * | 10/2019 | Turner ............... G01C 21/3691 |
| 10,453,260 B2 * | 10/2019 | Alaniz ................ G06F 3/04815 |

(Continued)

FOREIGN PATENT DOCUMENTS

| CN | 102103800 A | 6/2011 |
| CN | 103080983 A | 5/2013 |

(Continued)

*Primary Examiner* — John Villecco
(74) *Attorney, Agent, or Firm* — Dinsmore & Shohl LLP

(57) ABSTRACT

An information distribution system obtains event information such as image data about an event in the past or future using a collection server or a creation server, and stores the obtained event information in a storage server. The event information such as the image data is obtained with association to a location of the event and stored. The vehicle includes an image display system. An occupant wears a wearable device which is a display unit. When the location of an event is within the field of view of the occupant, the event image is displayed through the wearable device based on the event information such as the image data.

11 Claims, 12 Drawing Sheets

(56) References Cited

U.S. PATENT DOCUMENTS

| | | | | |
|---|---|---|---|---|
| 10,635,164 B2* | 4/2020 | Alaniz | | G06F 3/011 |
| 10,820,141 B2* | 10/2020 | Beaurepaire | | G06Q 50/01 |
| 11,024,081 B2* | 6/2021 | Kühne | | A63G 31/16 |
| 11,024,083 B2* | 6/2021 | Kim | | G06T 19/006 |
| 11,364,803 B2* | 6/2022 | Kuehne | | G02B 27/017 |
| 2002/0019696 A1* | 2/2002 | Kruse | | G01C 21/26 |
| | | | | 701/408 |
| 2008/0111832 A1* | 5/2008 | Emam | | G06T 3/00 |
| | | | | 345/633 |
| 2010/0198506 A1* | 8/2010 | Neilhouse | | G01C 21/365 |
| | | | | 701/532 |
| 2011/0153199 A1* | 6/2011 | Morimoto | | G08G 1/205 |
| | | | | 701/533 |
| 2011/0292076 A1* | 12/2011 | Wither | | G06F 16/58 |
| | | | | 345/632 |
| 2011/0301813 A1* | 12/2011 | Sun | | B62D 15/029 |
| | | | | 348/148 |
| 2014/0122640 A1* | 5/2014 | Coyle-Gilchrist | | |
| | | | | H04N 5/232933 |
| | | | | 709/217 |
| 2014/0129949 A1* | 5/2014 | Singer | | G06Q 30/02 |
| | | | | 715/733 |
| 2014/0248911 A1* | 9/2014 | Rouda, Jr. | | H04W 4/027 |
| | | | | 455/456.3 |
| 2017/0287217 A1* | 10/2017 | Kim | | H04N 5/2252 |
| 2018/0211414 A1* | 7/2018 | Cronin | | G05D 1/021 |
| 2018/0224932 A1* | 8/2018 | Von Novak | | G06F 3/013 |
| 2019/0317328 A1* | 10/2019 | Bae | | G02B 27/0093 |
| 2020/0021751 A1* | 1/2020 | Otaka | | G06V 20/588 |
| 2020/0035029 A1* | 1/2020 | Kuehne | | G02B 27/0179 |
| 2020/0162836 A1* | 5/2020 | Beaurepaire | | G06F 16/9537 |
| 2020/0218065 A1* | 7/2020 | Haar | | G06F 3/011 |
| 2021/0118192 A1* | 4/2021 | Sato | | G06T 11/00 |
| 2021/0229691 A1* | 7/2021 | Liu | | G06V 20/20 |
| 2021/0291657 A1* | 9/2021 | Kühne | | B60K 35/00 |
| 2021/0335045 A1* | 10/2021 | Kuehne | | G02B 27/01 |

FOREIGN PATENT DOCUMENTS

| | | | | | |
|---|---|---|---|---|---|
| CN | 208537853 | U | * | 2/2019 | |
| DE | 102020203428 | A1 | * | 9/2021 | |
| EP | 2793193 | A1 | * | 10/2014 | B60K 35/00 |
| EP | 3435036 | A1 | | 1/2019 | |
| JP | 1066005 | A | * | 3/1998 | |
| JP | 2004-219664 | A | | 8/2004 | |
| JP | 2004219664 | A | * | 8/2004 | |
| JP | 2011152865 | A | | 8/2011 | |
| JP | 5804571 | B2 | * | 11/2015 | B60R 1/00 |
| JP | 5955662 | B2 | * | 7/2016 | |
| JP | 2018-129094 | A | | 8/2018 | |
| JP | 6501035 | B2 | | 4/2019 | |
| JP | 2019139368 | A | | 8/2019 | |
| KR | 20200063789 | A | * | 6/2020 | |
| WO | 2012033095 | A1 | | 3/2012 | |

* cited by examiner

VEHICLE DISPLAY SYSTEM FOR DISPLAYING SURROUNDING EVENT INFORMATION

CROSS REFERENCE TO RELATED APPLICATION

This application claims priority to Japanese Patent Application No. 2019-221292 filed on Dec. 6, 2019, which is incorporated herein by reference in its entirety including the specification, claims, drawings, and abstract.

TECHNICAL FIELD

The present disclosure relates to a display system used by an occupant of a vehicle.

BACKGROUND

Techniques are known to display various types of information within a field of view of a driver or other occupant of a vehicle.

For example, JP 2004-219664A discloses displaying navigation information to a destination, and facility information associated with roads, buildings, and the like on a transmissive display of a head mounted display unit which the driver of a vehicle wears on the head. It is further described that when a person or obstacle is detected in front of the vehicle, an alarm is displayed.

SUMMARY

The techniques described in JP 2004-219664A display current information associated with a current view. The driver or other occupants merely obtain current information.

An object of a present disclosure is to provide an occupant of a vehicle new information about event around the vehicle while traveling that has not been provided by conventional techniques.

A display system according to the present disclosure includes an information obtaining unit which is configured to obtain event information about an event in the past or future located within a field of view of an occupant of a vehicle, and a display unit which is configured to display the event within the field of view of the occupant based on the obtained event information.

In one aspect of the present disclosure, the information obtaining unit obtains, as the event information, vehicle outside view image data that have been captured by a vehicle that has traveled in the past, and the display unit adjusts the obtained image data to correspond a traveling location of the vehicle with the occupant and displays the event based on the adjusted image data.

In another aspect of the present disclosure, the information obtaining unit obtains, as the event information, past traffic accident information, and the display unit displays an event of the traffic accident with a clear indication of the location of the traffic accident.

In yet another aspect of the present disclosure, the information obtaining unit obtains, as the event information, image data that have been created about an event assumed to have occurred in the past, and the display unit adjusts the obtained image data to correspond to a traveling location of the vehicle with the occupant and displays the event based on the adjusted image data.

In yet another aspect of the present disclosure, the information obtaining unit obtains, as the event information, virtual image data that have been created about an event assumed to occur in the future, and the display unit adjusts the obtained image data to correspond to a traveling location of the vehicle with the occupant and displays the event based on the adjusted image data.

In yet another aspect of the present disclosure, the occupant is a driver, and the display unit is configured to display a corresponding view by overlapping or replacing an actual view excluding a road.

In yet another aspect of the present disclosure, the occupant is not a driver, and the display unit is configured to display a corresponding view by overlapping or replacing an actual view including a road.

In yet another aspect of the present disclosure, the information obtaining unit is configured to obtain the image data captured in the past in fine or cloudy weather when the current weather around the vehicle with the occupant is rain or snow, and the display unit is configured to display a centerline based on the image data by overlapping or replacing an actual centerline.

According to the present disclosure, an occupant of a vehicle can recognize an event in the past or future around the vehicle while traveling.

BRIEF DESCRIPTION OF THE DRAWINGS

Embodiments of the present disclosure will be described based on the following figures, wherein.

DETAILED DESCRIPTION

Embodiments according to the present disclosure are described below with reference to the attached drawings. Although specific aspects of the embodiments are described below to facilitate understanding of the present disclosure, those specific aspects are provided merely as examples. Various other embodiments are possible.

Figure 1:
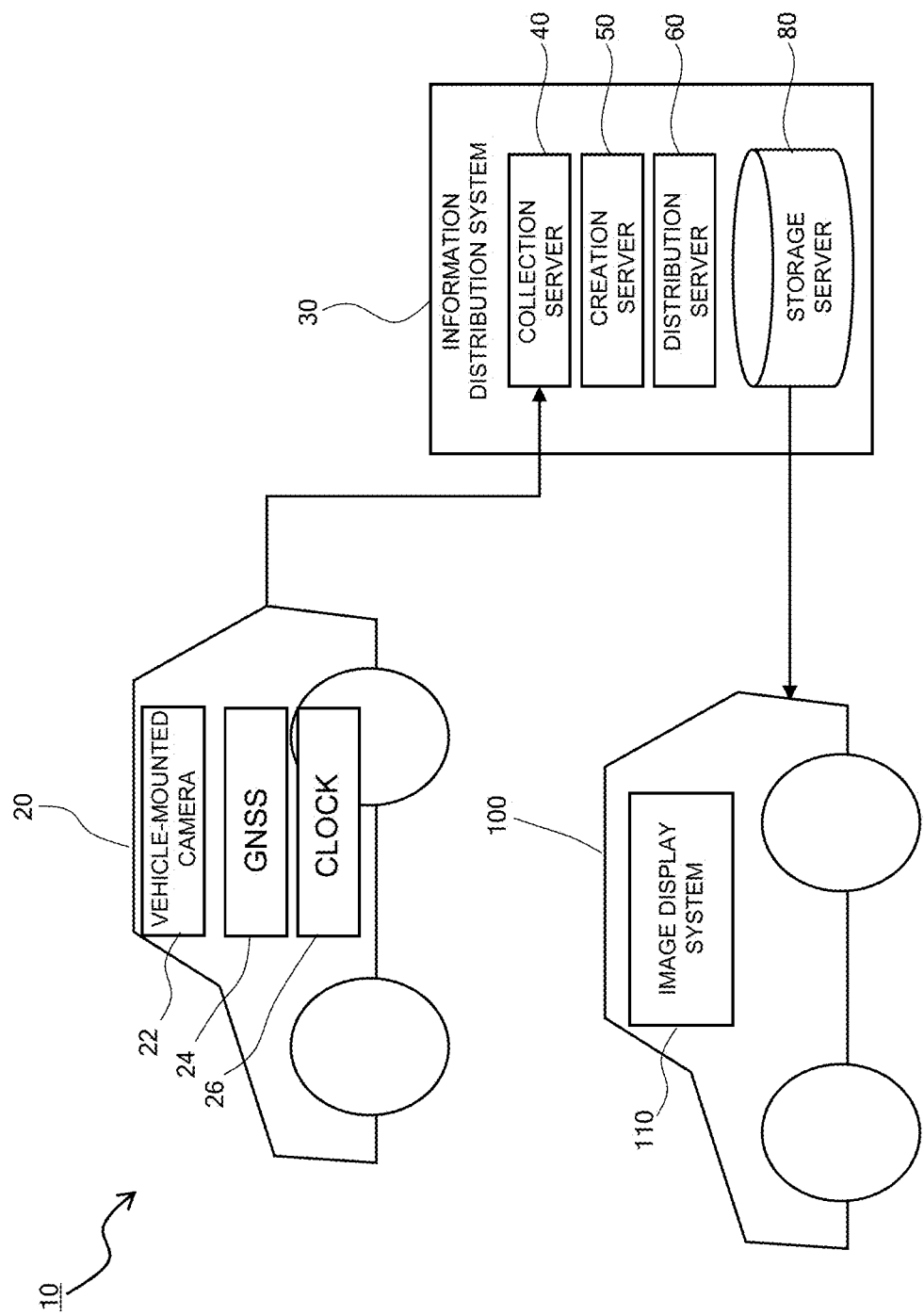
FIG. 1 is a schematic configuration diagram of an information system (an example of "display system") according to an embodiment of the present disclosure.

FIG. 1 is a schematic configuration diagram of an information system 10 according to an embodiment of the present disclosure. The information system 10 includes vehicles 20 that collect event information such as image data, an information distribution system 30, and a vehicle 100 for which there are performed processes to display an event based on the received event information. The event information is information that can be displayed about an event and may include text data which are represented by character codes (including numeric or other symbols), and two- or three-dimensional image data that are not represented by the character codes. The character codes and the image data can both be used to show an event in a view provided by a display unit. The "event" indicates an object or an incident that can be observed by a person. Examples of the event are described further below. The information system 10 can also process audio data including human voice, noise, sound, and music associated with the text data and the image data. The audio data are output as audio from a speaker.

Although multiple vehicles 20 may be used to collect event information such as image data, FIG. 1 shows only a single vehicle as an example. Under a contract with the owner of the vehicle 20, the information system 10 can use image data captured by the vehicle 20. The vehicle 20 that collects the image data can also be the vehicle 100 for which the image display is performed.

The vehicle 20 includes a vehicle-mounted camera 22, a GNSS 24, and a clock 26. The vehicle-mounted camera 22 is mounted on the vehicle 20 and captures views exterior or interior of the vehicle. The vehicle-mounted camera 22 may be attached inside the vehicle, for example, around a front end of a roof. The vehicle-mounted camera 22 captures camera image data (hereinafter referred to as "camera image data" to emphasize that the image data have been captured by the vehicle-mounted camera 22) by capturing the outside view in front of the vehicle through a front windshield. The camera image data are data that provide two- or three-dimensional visual information. Although the camera image data are video data in general, the camera image data may be still images captured at appropriate intervals. In the information system 10, the camera image data from the vehicle-mounted camera 22 are sent to the information distribution system 30, and further to the vehicle 100 in which the images may be displayed afterward. Accordingly, the vehicle-mounted camera 22 needs to be capable of capturing camera image data of a resolution required for display in the vehicle 100. Multiple vehicle-mounted cameras 22 may be provided in order to obtain sufficient resolution or a sufficient field of view.

The vehicle-mounted camera 22 may also function as a drive recorder which records, for example, a traveling status of the vehicle 20. For example, when the vehicle 20 has an autonomous driving mode, the vehicle-mounted camera 22 may also function as a sensor which senses traffic status around the vehicle 20. Although a visible-light camera which uses visible light is generally used as the vehicle-mounted camera 22, a camera of any of various wavelength bands, such as an infrared camera or a UV camera, may also be used. The vehicle-mounted camera 22 may capture views other than the front views, such as side views and/or rear views.

The GNSS (global navigation satellite system) 24 is a sensor which identifies the location of the traveling vehicle 20 using radio waves from satellites. The location identified by the GNSS 24 is used as "capture location data" to identify where the camera image data were captured. The trajectory of the vehicle 20 can be determined by following the capture location data in time sequence.

The clock 26 is an instrument to display time, including year, month, date, and time. Output from the clock 26 is used as "capture time data" to determine when the camera image data was captured.

The capture location data and the capture time data are associated with the camera image data and sent to the information distribution system 30. This sending may be performed through any of various types of wireless communication, such as Wi-Fi (registered trademark). The vehicle 20 may further include sensors to obtain data related to weather, such as a solar radiation sensor and a rain sensor. Output from these sensors may be used as "capture weather data" which indicate weather at the time of capturing the camera image data. The capture weather data may be associated with the camera image data and sent to the information distribution system 30.

The information distribution system 30 is a system that receives and stores data including image data sent from the vehicle 20, and distributes to the vehicle 100 data including the stored image data. The information distribution system 30 includes a collection server 40, a creation server 50, a distribution server 60, and a storage server 80. The information distribution system 30 is described below in detail with reference to FIG. 2.

Figure 2:
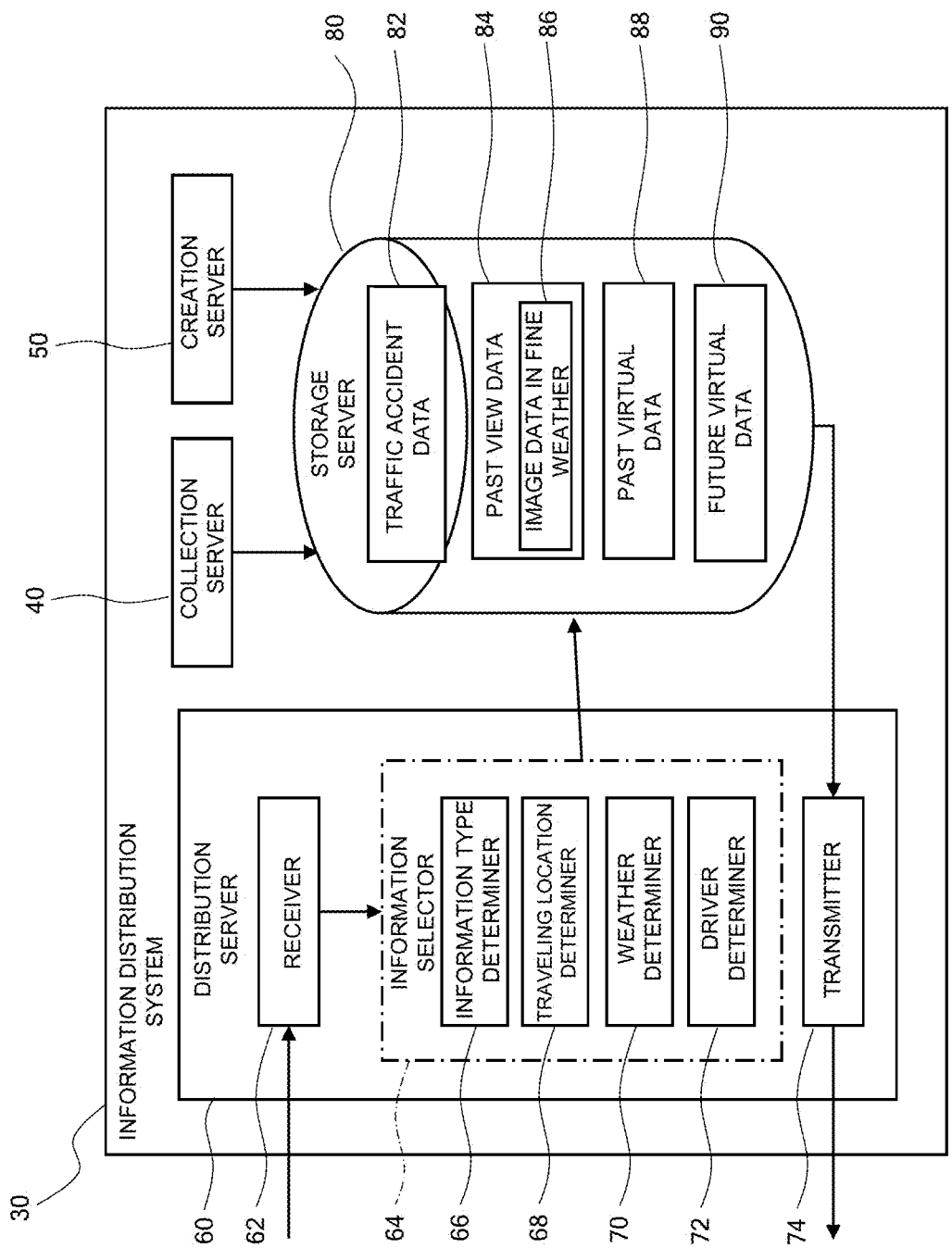
FIG. 2 is a schematic configuration diagram of an image delivery system.

FIG. 2 is a block diagram showing a schematic configuration of the information distribution system 30. The information distribution system 30 may be configured with a single or multiple computer hardware units. The computer hardware units may be concentrated, for example, at an information distribution company, or distributed at remote locations connected via a network.

The computer hardware unit is a unit which includes a memory, a processor, and other resources. The computer hardware unit operates by being controlled by the installed operating system (OS), and software, such as application programs. The information distribution system 30 includes the collection server 40, the creation server 50, the distribution server 60, and the storage server 80, all of which are configured using application programs.

The collection server 40 collects already-available image or other data via a network or other techniques. The collection server 40 obtains data from the vehicle 20, including the camera image data and associated data (the capture location data, the capture time data, and the capture weather data). The collection server 40 classifies the obtained data, such as the camera image data, based on the trajectory along which the vehicle 20 has captured the data, the date and time when the data were captured, and the weather in which the data were captured; and stores the classified data in the storage server 80.

Regarding the camera image data captured by the vehicle 20, the vehicle 20 may fail to capture sufficient view image data when, for example, a large vehicle in front of the vehicle 20 blocks the camera's view. In such a case, the view may be formed by combining, as required, multiple pieces of camera image data that have been captured under light traffic. The collection server 40 may blur human faces or license plate numbers when they are clear in the view.

When collecting the camera image data or other data, conditions about the subjects to be collected can be set to the collection server 40. For example, data may be collected only from the vehicles 20 which travel in low traffic areas or along specified routes, or from the vehicle 20 whose airbag was activated, indicating possible involvement in a traffic accident.

The collection server 40 may further collect event information about a traffic accident in cooperation with an external entity such as a police department or an insurance company. The event information about a traffic accident may be obtained as text data, indicating, for example, the date and time of occurrence, the location, the accident situation, and the damage situation. The event information of traffic accident may also be obtained as image data, such as photographs and video from an external entity, which may obtain the image data from a monitoring camera installed at a nearby road, a vehicle-mounted camera of the vehicles in the accident or nearby vehicles, or photographs taken by a pedestrian around the accident. The collection server 40 may obtain image data, including event information about a traffic accident, from camera images available from the vehicle 20.

The creation server 50 creates image data about past or future events. The creation server 50 creates virtual image data that would be viewed from the vehicle 100 under an assumption that the vehicle 100 is traveling in the past or future. The preparation of the images may be outsourced to an external company. In this case, the creation server 50 may import delivered images and store the imported images in the storage server 80. Related data, including text data that describe the image data, may be created and stored in the storage server 80. The creation server 50 may create virtual video data or still image data that reproduce traffic accident scenes in an easily understandable manner based on the text data about the traffic accident.

The distribution server 60 distributes event information, such as image data, to the vehicle 100. The distribution server 60 includes a receiver 62, an information selector 64, and a transmitter 74. The receiver 62 receives a distribution request for image or other data from the vehicle 100. When the receiver 62 receives a distribution request, the receiver 62 may also receive other information, such as a type of event information to be delivered and the location of the vehicle 100.

The information selector 64 selects event information to be distributed to the vehicle 100. The information selector 64 may include an information type determiner 66, a traveling location determiner 68, a weather determiner 70, and a driver determiner 72.

The information type determiner 66 selects the type of event information for which the distribution has been requested, based on the distribution request received by the receiver 62. Examples of the selectable types of event information are described further below.

The traveling location determiner 68 determines a geographical range of event information to be distributed, based on the traveling location data received from the vehicle 100. The traveling location determiner 68 determines a range of event information to be distributed by predicting the location of the vehicle 100 in the immediate future (for example, a few or a few tens of seconds later) based on not only the current location of the vehicle 100 but also the traveling direction, the traveling speed, or other factors.

The weather determiner 70 determines the weather around the vehicle 100 based on the traveling location data received from the vehicle 100. In order to make a determination, weather information, such as that provided by a weather forecast service, may be used. The weather determiner 70 may determine the weather around the vehicle 100 based on the weather data received from the vehicle 100.

The driver determiner 72 determines whether or not the distribution request from the vehicle 100 has been requested by a driver. When the distribution request has been requested by a driver alone, the driver determiner 72 determines that, from the image data to be distributed, a road view (such as road surfaces, other traveling vehicles, pedestrians, traffic lights, and road signs) can be omitted. Such an omission can reduce the amount of information to be distributed.

The transmitter 74 obtains the event information to be distributed from the storage server 80 and sends the obtained event information to the vehicle 100.

The storage server 80 stores event information about past or future events to be distributed. The event information stored in the storage server 80 may include traffic accident data 82, past view data 84, past virtual data 88, and future virtual data 90.

The traffic accident data 82 are an example of the event information about past events, and may include the event information of traffic accidents collected by the collection server 40. The traffic accident data 82 to be stored may include traffic accident text data, which are text data and traffic accident image data, which are image data. The traffic accident text data may include information, such as, for each traffic accident, the date and time of occurrence of the traffic accident, location, accident situation, and damage situation. The traffic accident image data may include the camera image data obtained by the vehicles in the traffic accident, vehicles located nearby to the traffic accident, and pedestrians or monitoring cameras installed on streets. As the image data of the traffic accident data 82, video data and still image data created by the creation server 50 may also be used.

The past view data 84 are an example of the event information of past events, and may include event information about actual past view collected by the collection server 40; specifically, the camera image data captured by the vehicle-mounted camera 22 of the vehicle 20 in the past. The past view data 84 may also include text data that describe the camera image data, such as the date and time when the camera image data were captured and the weather at the time of capturing the camera image data.

The past view data 84 may include image data in fine weather 86, which are camera image data captured in fine weather. As described further below, the image data in fine weather 86 may be used to compensate for poor visibility in rain or snow. Although it is also possible to use image data captured not only in fine weather but also in cloudy or other weather other than raining or snowing, the image data in fine weather 86 are used in this embodiment in consideration of clarity of images.

The past virtual data 88 are an example of event information of past events, and may include past virtual event information created by the creation server 50. The past virtual data 88 may include past virtual image data, which are image data, and past virtual text data, which describe the past virtual image data. The past virtual data 88 are event information which provides potential views that would be seen around the vehicle under an assumption that the vehicle 100 is traveling at a certain point of time in the past. For example, image data are created to display, in the far sceneries (mountains, beaches, rivers, or other sceneries) that would be seen when the vehicle 100 currently travels along the road, past images, such as natural objects like forests, past buildings such as castles and houses, and people dressed as though at that time. Alternatively, in an area where a historical event took place in the past, image data may be created to enable occupants to view such a historical event while driving in the vehicle 100. The historical event includes, for example, political events, religious events, cultural events, celebrations and festivals, wars, visit of celebrities, disasters (volcanic eruptions, earthquakes, fires), and astronomical phenomena (appearance of comets, white nights, lunar eclipses). The past virtual data 88 may also be used to reproduce a past climate such as an ice age, or plants and animals whose fossils have been excavated. Further, legends and folklore known in the area may be reproduced.

The future virtual data 90 are an example of event information of future events, and may include future virtual event information created by the creation server 50. The future virtual data 90 may include future virtual image data, which are image data, and future virtual text data, which describe the future virtual image data. The future virtual data 90 are created to provide potential views which would be seen under an assumption that the vehicle 100 is traveling in the future. For example, in one embodiment, image data are created to display, in the far sceneries that would be seen when the vehicle 100 currently travels along the road, future images, such as natural objects, buildings, and people dressed as though in the future. Alternatively, image data may be created to simulate an event which can be expected in the future. The buildings that can be expected in the future include, for example, buildings, roads, railroads, and airports based on city planning by the national government or local governments. Vehicles and clothes that have been proposed by research institutes or companies can be expected to be realized in the future. Furthermore, disasters based on hazard maps prepared by local governments or other organizations may be the events that can be expected in the future.

Figure 3:
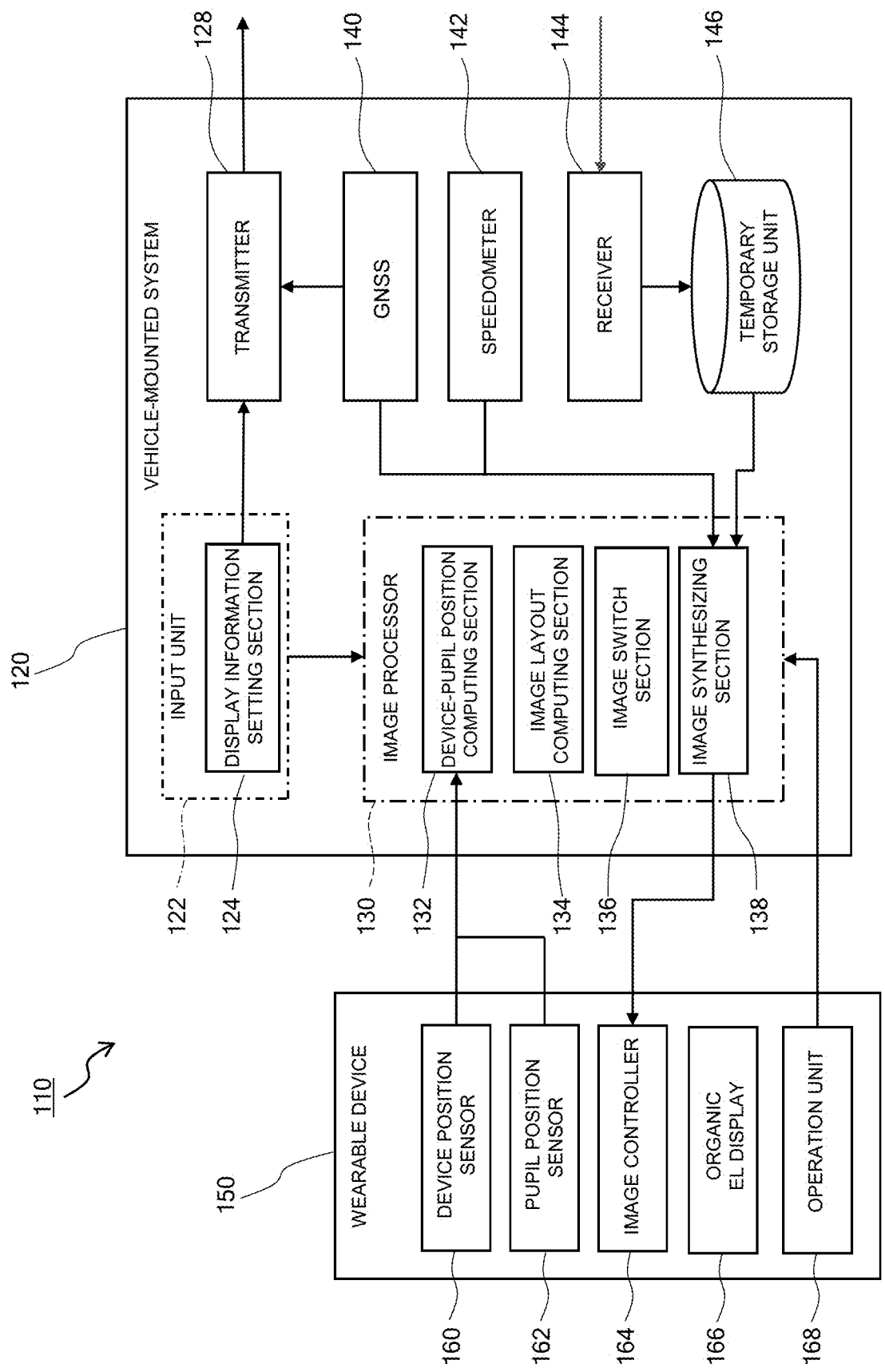
FIG. 3 is a schematic configuration diagram of an image display system.

Next, the vehicle 100 in FIG. 1 is described with reference to FIG. 3. The vehicle 100 is a vehicle that includes an image display system 110 in FIG. 3. As shown in FIG. 3, the image display system 110 includes a vehicle-mounted system 120 and a wearable device 150.

The vehicle-mounted system 120 is typically a device that is fixed on the vehicle 100. The vehicle-mounted system 120 includes an input unit 122, a transmitter 128, an image processor 130, a GNSS 140, a speedometer 142, a receiver 144, and a temporary storage unit 146.

The input unit 122 is a user interface that is used by a user, such as a driver of the vehicle 100, to set the image display system 110. The input unit 122 is configured with, for example, a touch panel provided on an instrument panel of the vehicle 100. The input unit 122 includes a display information setting section 124 through which various settings about event information to be displayed on the wearable device 150 are set.

The user can use the display information setting section 124 to set a data category to be displayed, such as the traffic accident data 82, the past view data 84, the past virtual data 88, or the future virtual data 90. The user can select from the data a single data category or multiple data categories to be displayed. When multiple data categories are selected, it is further possible to set a priority of the data categories to be displayed. For example, when the traffic accident data 82 and the past view data 84 are selected, the priority can be set such that the past view data 84 are usually displayed, while at a spot with the traffic accident data 82, the traffic accident data 82 have a priority to be displayed or can be displayed overlapping the past view data 84. When the past view data 84 are selected and multiple data are available for the past view data 84, it is further possible to set the year or the season when the view was captured. Regarding the traffic accident data 82, the past virtual data 88, and the future virtual data 90, settings can be made such that text data or an icon with a mark alone to indicate an outline may be displayed initially. Then, image data may be displayed only when the user requests a detailed display through the icon.

The transmitter 128 sends a distribution request of event information to the information distribution system 30. In the distribution request, the type of the requested data is clarified in accordance with the settings in the display information setting section 124. Further, other data, such as traveling location data of the vehicle provided by the GNSS 140, are sent as required. Alternatively, it is also possible to collectively send traveling routes set in the navigation system of the vehicle 100 as the traveling location data.

The image processor 130 is a device to perform image processing to display, through the wearable device 150, event information received from the information distribution system 30. The image processor 130 is in the form of computer hardware including a memory and a processor which is controlled by an operating system (OS) and software, such as an application program. The image processor 130 uses application programs to establish a device-pupil position computing section 132, an image layout computing section 134, an image switch section 136, and an image synthesizing section 138.

The device-pupil position computing section 132 computes a relative position of the wearable device 150 and relative positions of the pupils of a driver 180 inside the vehicle based on an input from a device position sensor 160 and a pupil position sensor 162 of the wearable device 150.

In order to display an image as requested through the input unit 122, the image layout computing section 134 computes which images to be displayed and where to position the images; in other words, how to lay out the images to be synthesized. When determining the layout, the image layout computing section 134 uses the relative position data of respective components of the vehicle that have been stored in advance and the relative position data of the wearable device 150 and the relative position data of the pupils computed by the device-pupil position computing section 132. In this way, it becomes possible to compute the position, on an organic EL display 166, of a linear line connecting the pupils of the user with the wearable device 150 and a specific component of the vehicle. The image layout computing section 134 further computes which image is to be displayed and where on the organic EL display 166 the image should be displayed.

When multiple types of image data are selected to be displayed by the display information setting section 124, the image switch section 136 switches the images in accordance with a priority. The image switch section 136 also switches the image to be displayed from text data to image data or vice versa, or to display both of the text data and the image data.

The image synthesizing section 138 is one example of information obtaining unit. The image synthesizing section 138 obtains the image data and the text data in accordance with the setting of the image switch section 136 and synthesizes the images in accordance with the layout computed by the image layout computing section 134. The image synthesizing section 138 synthesizes the images corresponding to the traveling location of the vehicle 100 by obtaining the traveling location data from the GNSS 140 and the traveling speed data from the speedometer 142. The synthesized image is sent to an image controller 164 of the wearable device 150 to be displayed on the organic EL display 166. The transmission of the images can be performed through wired or wireless communications. For wireless communications, short-range wireless communications, such as Bluetooth (registered trademark), Wi-Fi (registered trademark), and infrared communication, can be used.

The GNSS 140 identifies the traveling location of the vehicle 100 and outputs the traveling location data which are sent to the information distribution system 30 via the transmitter 128.

The speedometer 142 senses the traveling speed of the vehicle 100 and outputs traveling speed data. The traveling speed data relate to the traveling location of the vehicle which changes over time and can be used, together with the traveling location data output from the GNSS 140, to identify the traveling location of the vehicle 100. As described above, the traveling location data and the traveling speed data are sent to the image synthesizing section 138.

The receiver 144 receives the image data and the text data sent from the information distribution system 30. The received data are stored in the temporary storage unit 146.

The temporary storage unit 146 stores the image data and the text data received through the receiver 144. Because it is impossible to accurately predict in which direction the vehicle 100 will travel, the vehicle-mounted system 120 uses streaming technology, which allows continuous display of the data received in accordance with the traveling location. The temporary storage unit 146 allows seamless display of images by temporarily storing the image data and the text data in advance based on the prediction results of the immediate future traveling location of the vehicle 100 provided by the traveling location determiner 68. However, for example, when a traveling route is set by a navigation system of the vehicle 100, the vehicle 100 is highly likely to travel along the traveling route. In that case, it is also possible to download in advance the image data and text data in accordance with the traveling route. Further, it is also possible to download in the temporary storage unit 146 all the image data and the text data pertaining to the area in which the vehicle 100 often travels.

The wearable device 150 is a device which the occupant including the driver in the vehicle 100 wears, as glasses or goggles. The wearable device 150 includes the device position sensor 160, the pupil position sensor 162, the image controller 164, the organic EL display 166, and an operation unit 168.

Figure 4:
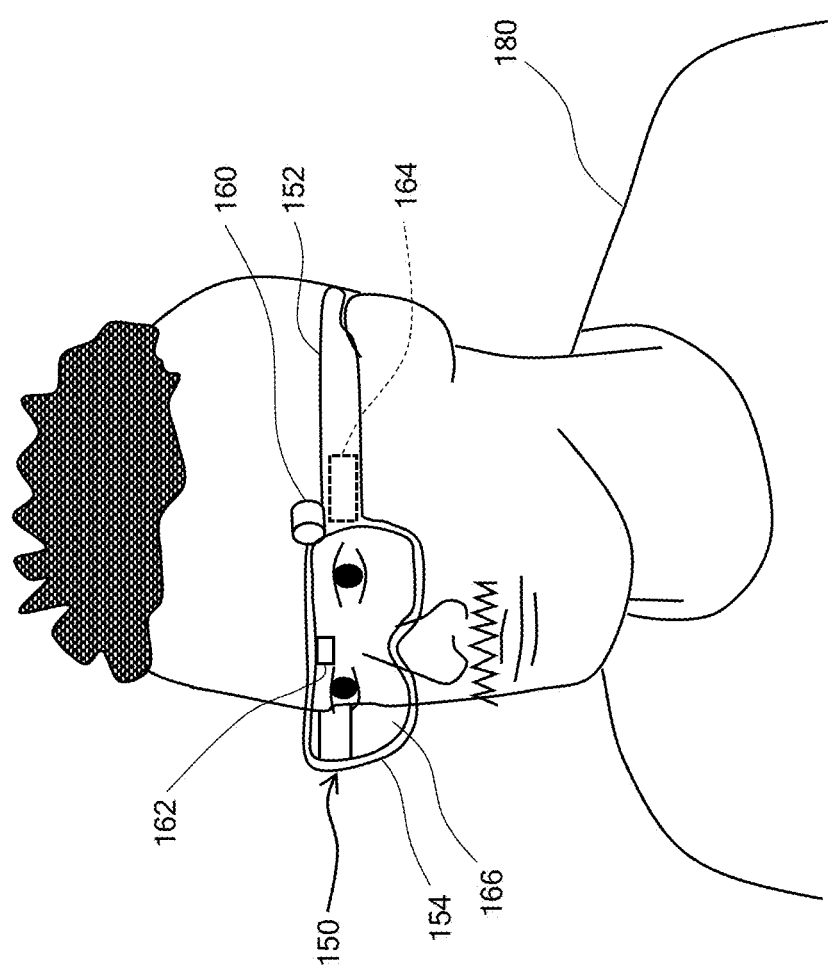
FIG. 4 is a diagram showing a user (driver) wearing a wearable device.

The wearable device 150 is described in detail below with reference to FIG. 4. FIG. 4 shows a driver 180 who wears the wearable device 150. The wearable device 150 has a shape of glasses and is also called "smart glasses". The wearable device 150 includes temples 152, which are linear portions of the frame resting on the ears, and a rim 154, which is connected to the temples 152, surrounds the eyes, and has a shape to fit on the nose.

The organic EL (Electro Luminescence) display 166, which is one example of a display unit, is provided inside the rim 154. Although the organic EL display 166 is positioned in front of the eyes of the driver 180, because of the high transparency (high translucency) when no image is displayed, the driver 180 can view the front. The organic EL display 166 can form an image partially or entirely based on the control of the image controller 164.

The device position sensor 160 is provided around a joint between the rim 154 and the temple 152 on the left eye side of the driver 180. The device position sensor 160 senses a relative position of the wearable device 150 inside the vehicle 100. The device position sensor 160 can be configured with, for example, a camera which captures front images. Thus, by comparing the images captured by the camera and the vehicle interior layout data, the position and orientation of the camera can be determined. With the camera fixed on the rim 154, the position and the orientation of the wearable device 150 can be sensed.

The pupil position sensor 162 is provided around the top center of the rim 154. The pupil position sensor 162 senses a relative position of the right and left eyes of the driver 180 in relation to the rim 154. Similarly to the device position sensor 160, the pupil position sensor 162 may be configured with a camera or other devices.

The image controller 164 is embedded in one of the temples 152. The image controller 164 displays images on the organic EL display 166 based on the data received from the vehicle-mounted system 120. The wearable device 150 can provide a visual environment different from usual views by displaying event images by the organic EL display 166 via the image controller 164.

The operation unit 168 is provided to enable operation of an object displayed on the organic EL display 166. Images of the objects to be operated, such as a button, can be displayed on the organic EL display 166. The operation unit 168 is used to operate the button or other objects. The operation unit 168 may also be operated with the voice of the driver or other occupant who is wearing the wearable device 150, or with a line of vision of the operator. The operation unit 168 may be configured with a mechanical button provided on the temple 152 and the rim 154 of the wearable device 150. By provision of the operation unit 168, it becomes possible to first display text data or a symbol to indicate an outline, and to switch to image or other data after an operation. It should be noted that it is also possible to perform similar operation through the input unit 122 of the touch panel provided on the instrument panel of the vehicle 100, without providing the operation unit 168 for the wearable device 150.

The image display system 110 performs real time processing at short intervals. Thus, the vehicle-mounted system 120 obtains sensed data from the device position sensor 160 and the pupil position sensor 162 of the wearable device 150 at short intervals. The device-pupil position computing section 132 immediately computes the position of the wearable device 150 and the position of the pupils based on the obtained sensed data. In this way, the field of view of the driver 180 in the vehicle 100 in relation to a front windshield 206 can also be obtained. It should be noted that the field of view of the driver 180 can be set based on standard human data. In the embodiment shown in FIG. 4, the field of view may be set to, for example, the area of the organic EL display 166 surrounded by the rim 154. Together with the traveling location data output from the GNSS 140, the relative positions between the field of view of the driver 180 and the event position can be obtained. The combination of the device position sensor 160, the pupil position sensor 162, and the GNSS 140 is thus one example of an area determination technique. Then, the image layout computing section 134 computes a layout to display images requested through the input unit 122. The image synthesizing section 138 synthesizes the images from the temporary storage unit 146 in accordance with the layout and sends the synthesized images to the wearable device 150.

The wearable device 150 processes the received synthesized image data using the image controller 164 and displays the processed data on the organic EL display 166. Because the processing up to the image display is performed at a high speed, even when the driver 180 turns his or her head, processing can follow the movement at a high speed. The driver 180 wearing the wearable device 150 can thus see the outside views which differ from the actual views without feeling much discomfort.

In the above embodiment, a device including the image controller 164 and the organic EL display 166 is described as an example of the wearable device 150. However, the wearable device 150 may use other principles. For example, an embodiment with a projector which projects images to the retinas may be used. The wearable device 150 may also be opaque to visible light from outside, and display images that have been captured by a camera.

Figure 10:
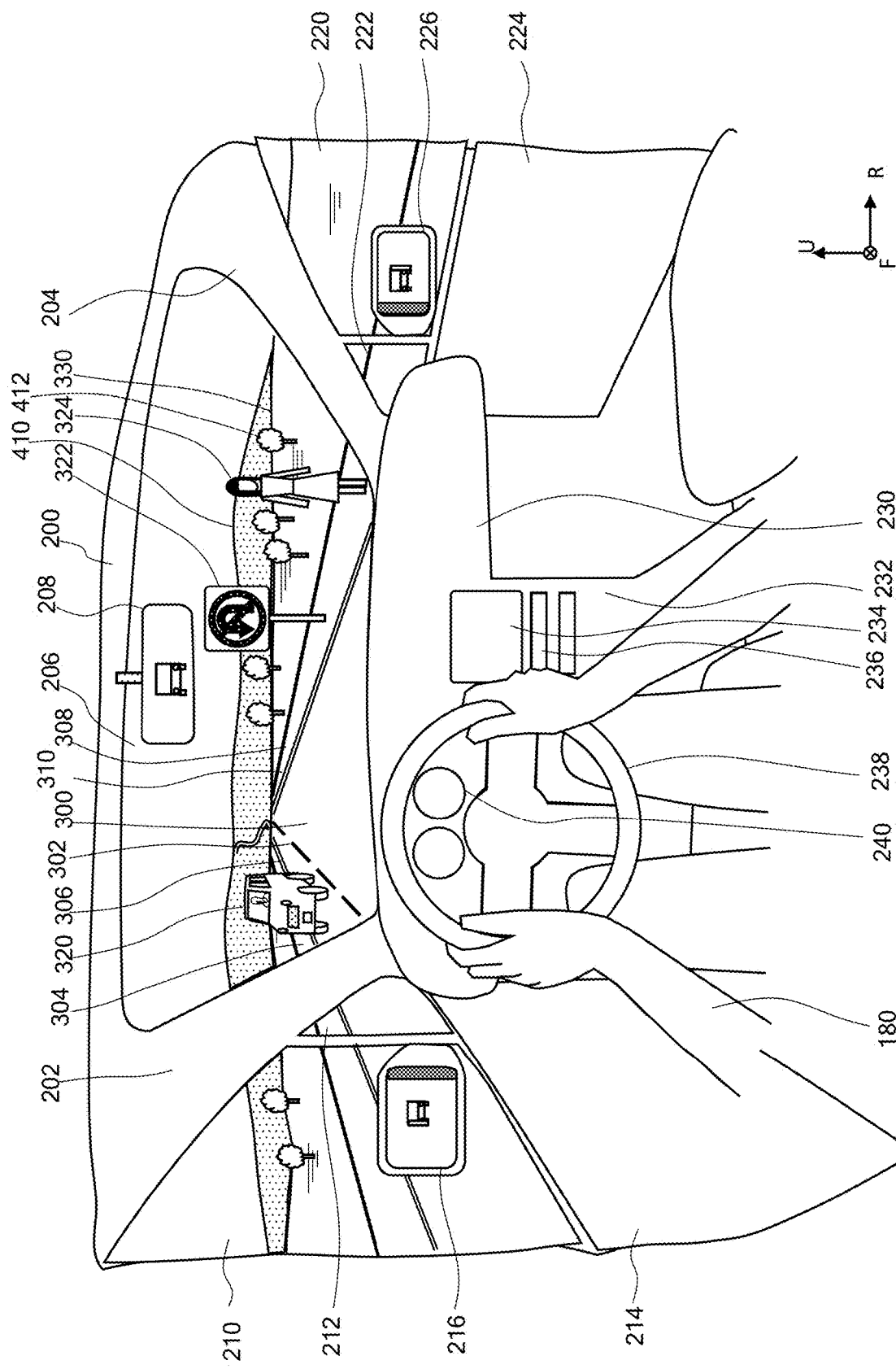
FIG. 10 is a diagram showing a field of view with a displayed past view.
Figure 11:
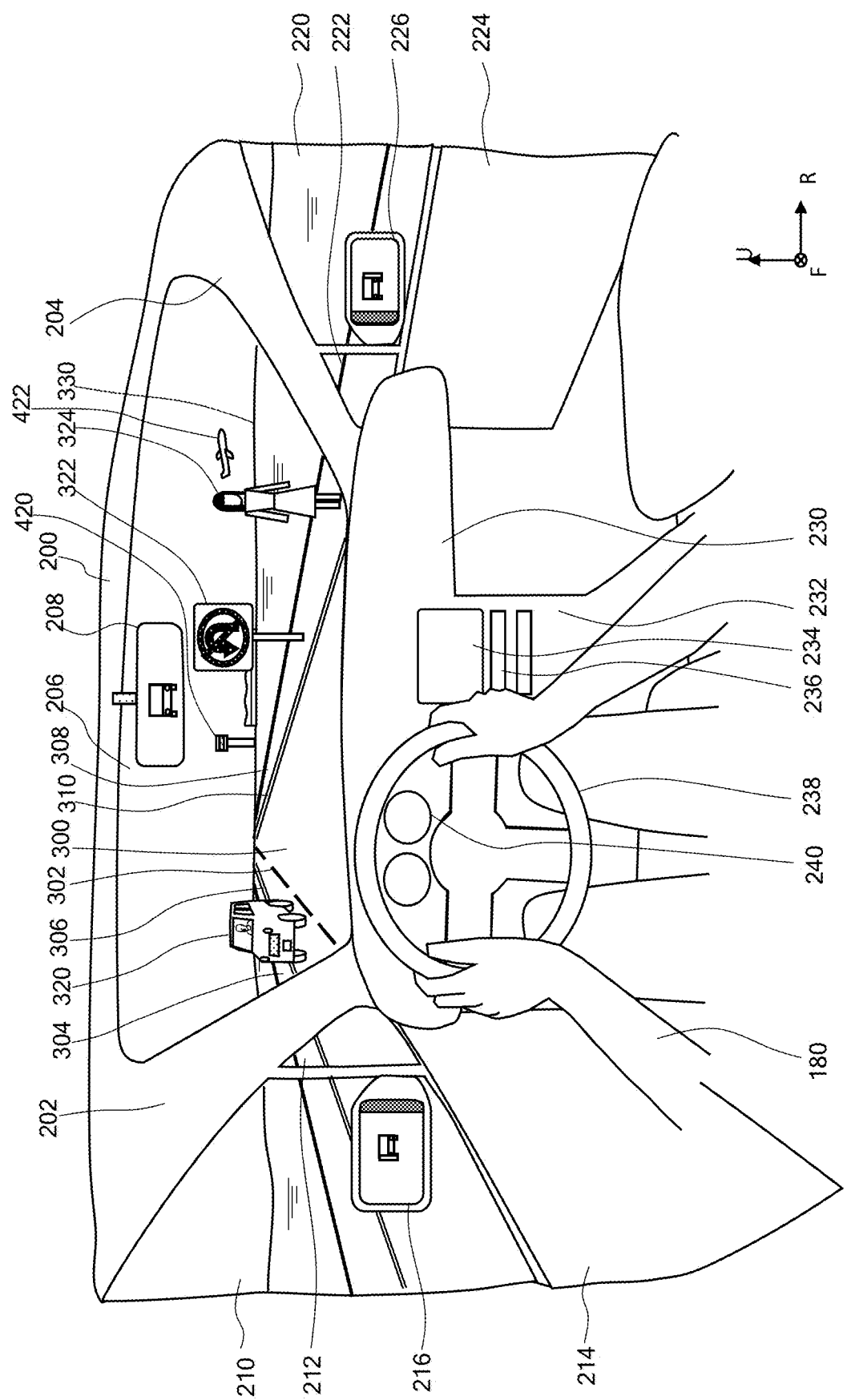
FIG. 11 is a diagram showing a field of view with a displayed virtual future view.
Figure 12:
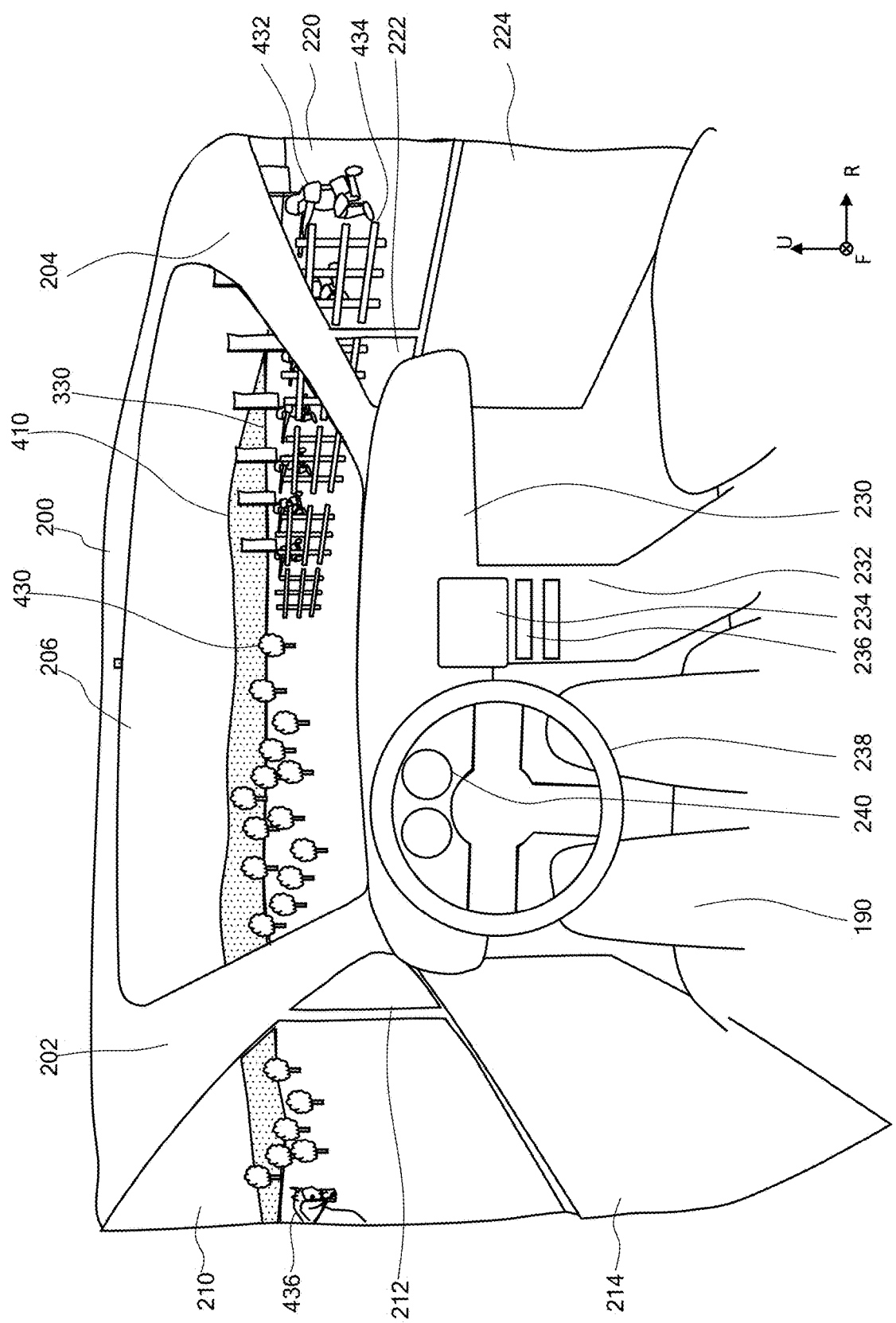
FIG. 12 is a diagram showing a field of view with a displayed virtual past view.

Examples of images displayed by the wearable device 150 are described below with reference to FIGS. 5 to 12. FIGS. 5 to 11 show a schematic field of view of the driver 180 who wears the wearable device 150; and FIG. 12 shows a schematic diagram of a field of view of an occupant (other than the driver 180) who wears the wearable device 150. In the coordinate system in the drawings, arrow F indicates the front of the vehicle; arrow U indicates the up direction, and arrow R indicates the rightward direction in relation to occupants. The driver 180 is seated on the driver's seat provided on the left of the vehicle. It is assumed that the vehicle 100 is traveling in right-hand traffic.

Figure 5:
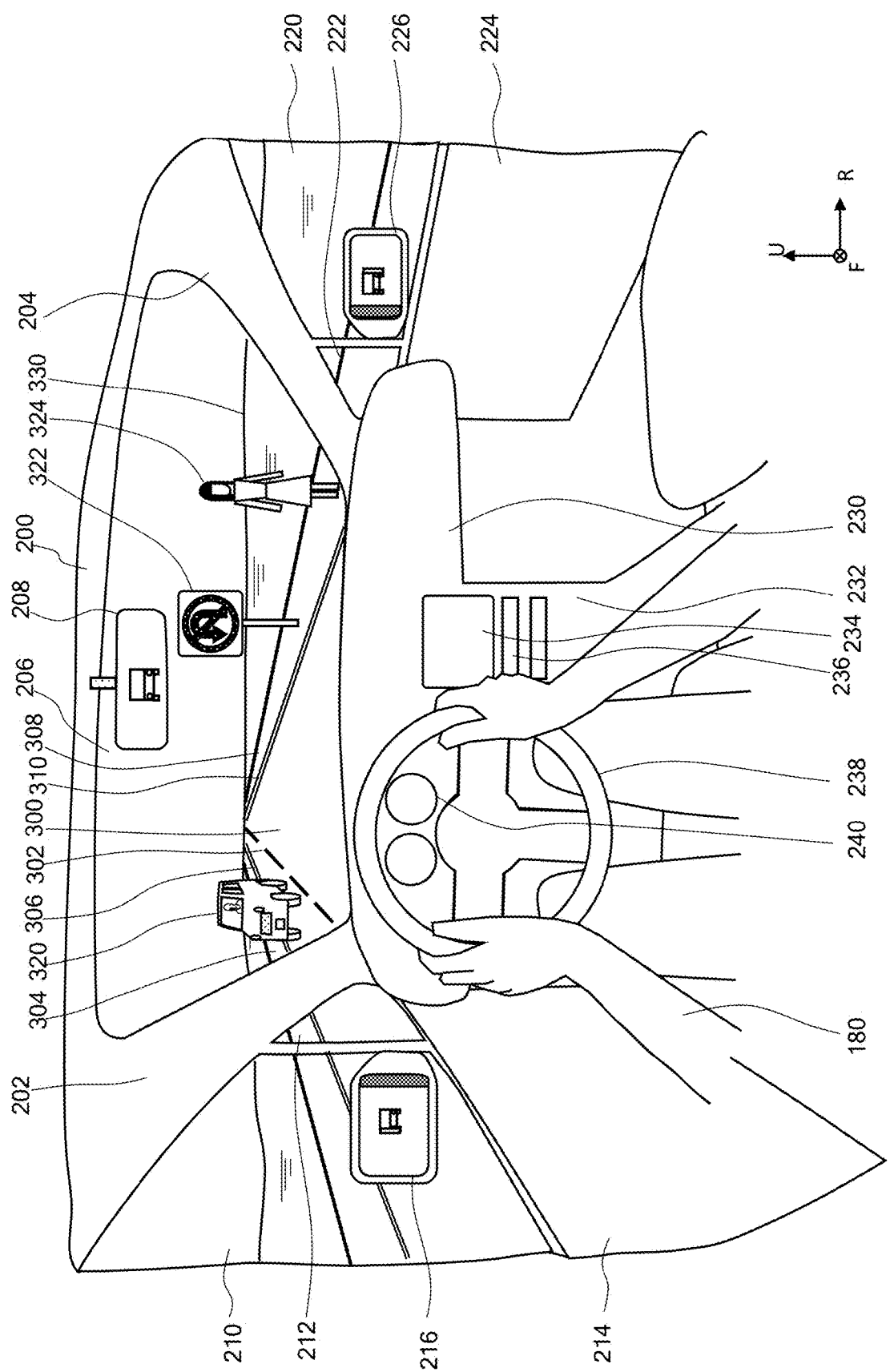
FIG. 5 is a diagram showing a field of view with no image displayed.

FIG. 5 shows a view with no image displayed by the wearable device 150. In this case, the field of view of the driver 180 is identical to that seen through naked eyes.

A roof 200 is shown in the upper area in the field of view. A left A-pillar 202 (also called a "left front pillar") and a right A-pillar 204 are seen on the left and right of the roof 200, respectively. The transparent front windshield 206 (also called a "front glass") is provided in the area surrounded by the roof 200, the left A-pillar 202, and the right A-pillar 204. An inner mirror (rear-view mirror) 208 affixed to the roof 200 is shown around the top of the front windshield 206, showing a vehicle traveling behind.

On the left of the driver 180, a left-front side window (also called a "left-front side glass") 210 and a left triangular quarter window 212 in front of the left-front side window 210 are shown. A left-front door trim 214 which is disposed on the inner side of a left-front door is shown below the left-front side window 210. A left outer mirror (also called a "left side-view mirror") 216 is shown through the left-front side window 210, showing a part of a side surface of the vehicle and a vehicle traveling behind.

On the right of the driver 180, a right-front side window 220 and a right triangular quarter window 222 in front of the right-front side window 220 are shown. A right-front door trim 224 which is disposed on the inner side of a right front door is shown below the right-front side windshield 220. A right outer mirror 226 is shown through the right-front side windshield 220, showing a part of a side surface of the vehicle and a vehicle traveling behind.

An instrument panel 230 is disposed below the front windshield 206. A center console 232 is provided continuously below the instrument panel 230 at the center. The instrument panel 230 and the center console 232 include a touch panel 234 and operation buttons 236. The input unit 122 of the wearable device 150 which the driver 180 wears may be included in the touch panel 234 or the operation buttons 236.

A steering wheel 238 is provided in front of the driver 180 and behind the instrument panel 230. Both hands of the driver 180 are placed on the steering wheel 238. Meters and gauges 240 such as a speedometer of the instrument panel 230 are shown inside the steering wheel 238.

An outside view is shown through the front windshield 206. The vehicle 100 travels on a right lane extending ahead. A centerline 302 lies at the center of a roadway 300. A left sidewalk 304 is provided on the left of the roadway 300, with curbstones 306 forming a border from the roadway 300. A right sidewalk 308 is provided on the right of the roadway 300, with curbstones 310 forming a border from the roadway 300.

An opposing vehicle 320 travels on the left lane of the roadway 300. A road sign 322 is installed on the right sidewalk 308. A pedestrian 324 walks on the right sidewalk 308.

The roadway 300 continues ahead to a gentle downhill (not shown). Accordingly, a skyline 330 is formed between the ground and the sky.

Figure 6:
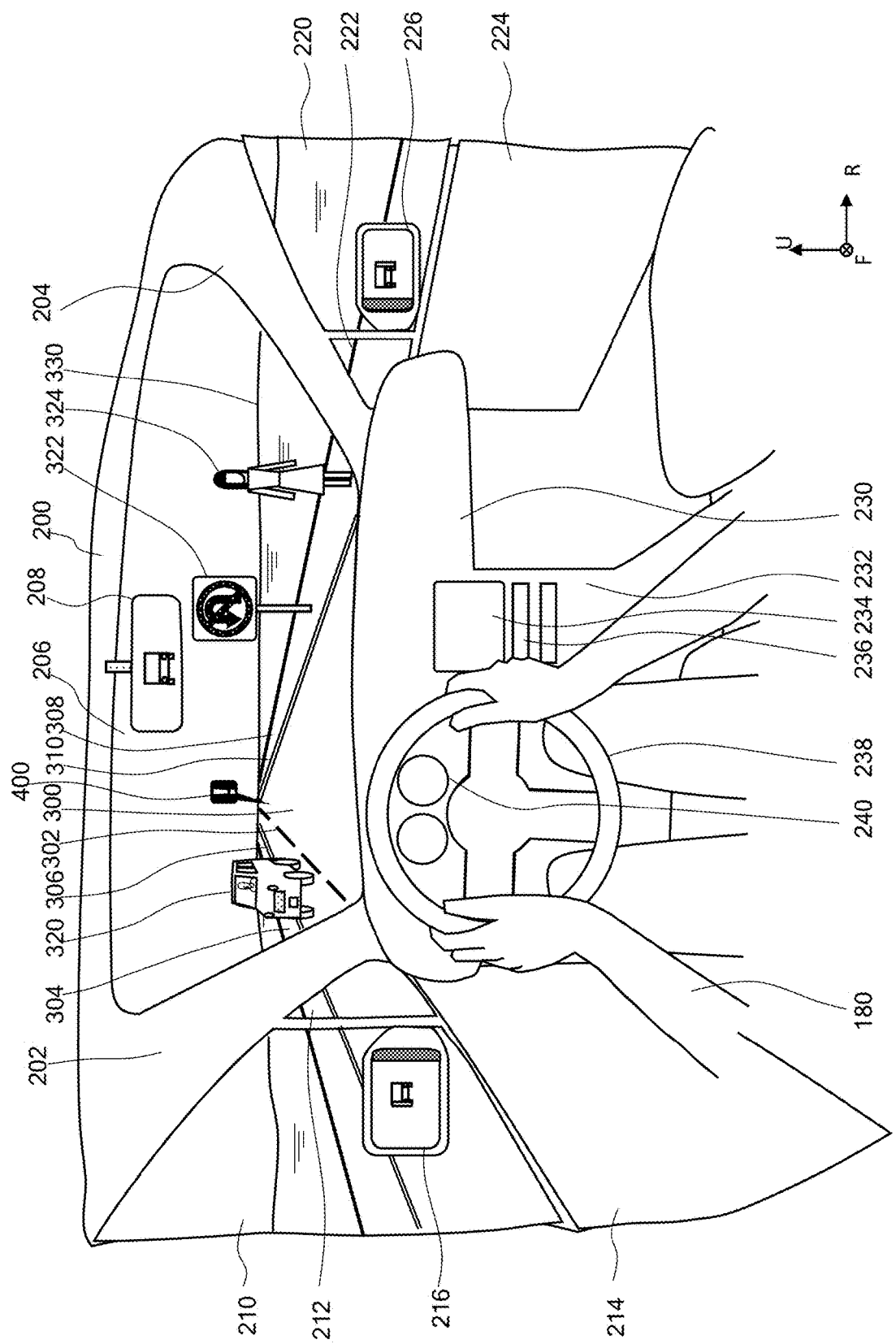
FIG. 6 is a diagram showing a field of view with an icon representing an outline of a traffic accident.
Figure 7:
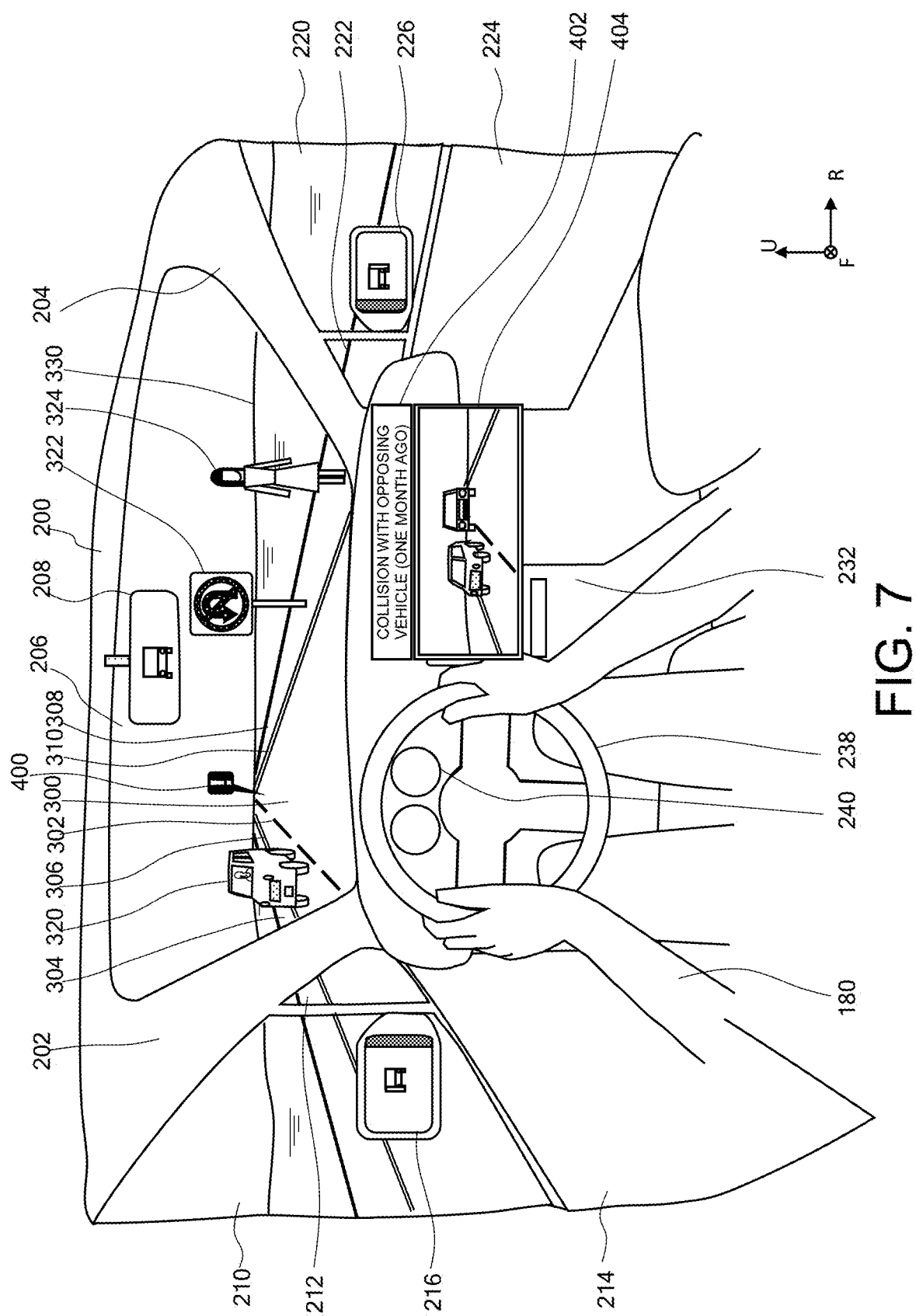
FIG. 7 is a diagram showing a field of view with details of the traffic accident displayed by operating the icon.

FIGS. 6 and 7 show, in time order, display examples displayed through the wearable device 150 based on the traffic accident data 82.

FIG. 6 shows a view immediately after FIG. 5. An icon 400 of a "!" sign is displayed ahead in the right lane of the roadway 300. The icon 400 is displayed to indicate a location where a traffic accident occurred in the past in order to caution the driver 180. In the vehicle-mounted system 120 of the vehicle 100, the image switch section 136 of the image processor 130 determines the traveling location based on the traveling location data from the GNSS 140 of the vehicle-mounted system 120 and the traveling speed data from the speedometer 142 of the vehicle-mounted system 120. The image switch section 136 also compares the determined traveling location and the location of the traffic accident data 82 stored in the temporary storage unit 146. As a result of the comparison, when it is determined that the vehicle 100 is approaching the location of the traffic accident data 82, the icon 400 is displayed. Because it is important to accurately identify the location of a traffic accident in order to know about the accident, the icon 400 is configured to indicate the location of a traffic accident with high accuracy.

The icon 400 is displayed such that most of the icon 400 is displayed above the skyline 330, in order to allow the driver 180 to have a sufficient field of view for driving. The icon 400 merely indicates the location of the traffic accident, but not the details of the traffic accident. The icon 400 is displayed as an operable button.

FIG. 7 shows a view when the driver 180 has operated the icon 400 through the operation unit 168 of the wearable device 150 in the view shown in FIG. 6. A text data display window 402 and an image data display window 404 are displayed on a front passenger seat side of the instrument panel 230. This display position does not obstruct the field of view of the driver 180 toward outside the vehicle, or the fields of view toward the steering wheel 238 and the meters and gauges 240.

The text data display window 402 briefly describes a collision with an overtaking opposing vehicle which occurred a month ago. The image data display window 404 displays video data immediately before the collision. The video data were captured by a vehicle-mounted camera of the vehicle in the collision. The camera image data clearly displays an opposing vehicle which is attempting to overtake a vehicle in the left lane from behind and travels out to the right lane.

The driver 180 can instantly grasp the outline of the traffic accident by watching the display windows 402, 404. At the location indicated by the icon 400, the driver 180 can anticipate that an opposing vehicle that travels out to the right lane may come from ahead of the skyline 330. In this way, as the driver 180 drives while looking forward with intense caution, a similar traffic accident can be prevented.

In the embodiment shown in FIG. 6, the icon 400 is a "!" mark in a frame. However, slightly more detail of the event information may be provided to the driver 180 by displaying text data of, for example, "front collision", or a simple graphic or mark that indicates a front collision, in place of the "!" mark.

Further, in the embodiment shown in FIG. 7, the text data display window 402 and the image data display window 404 are displayed together. Alternatively, it may be the case that only one of the display windows 402, 404 is displayed. In place of video, still images may be displayed on the display window 404. Further, the display window 404 may display not an actual traffic accident image but a schematic image.

In another embodiment, when the vehicle 100 approaches the location of a traffic accident, the display of only the icon 400 shown in FIG. 6 may be skipped. Thus, the display windows 402, 404 shown in FIG. 7 may be displayed immediately to inform the details of the traffic accident to the driver 180.

Figure 8:
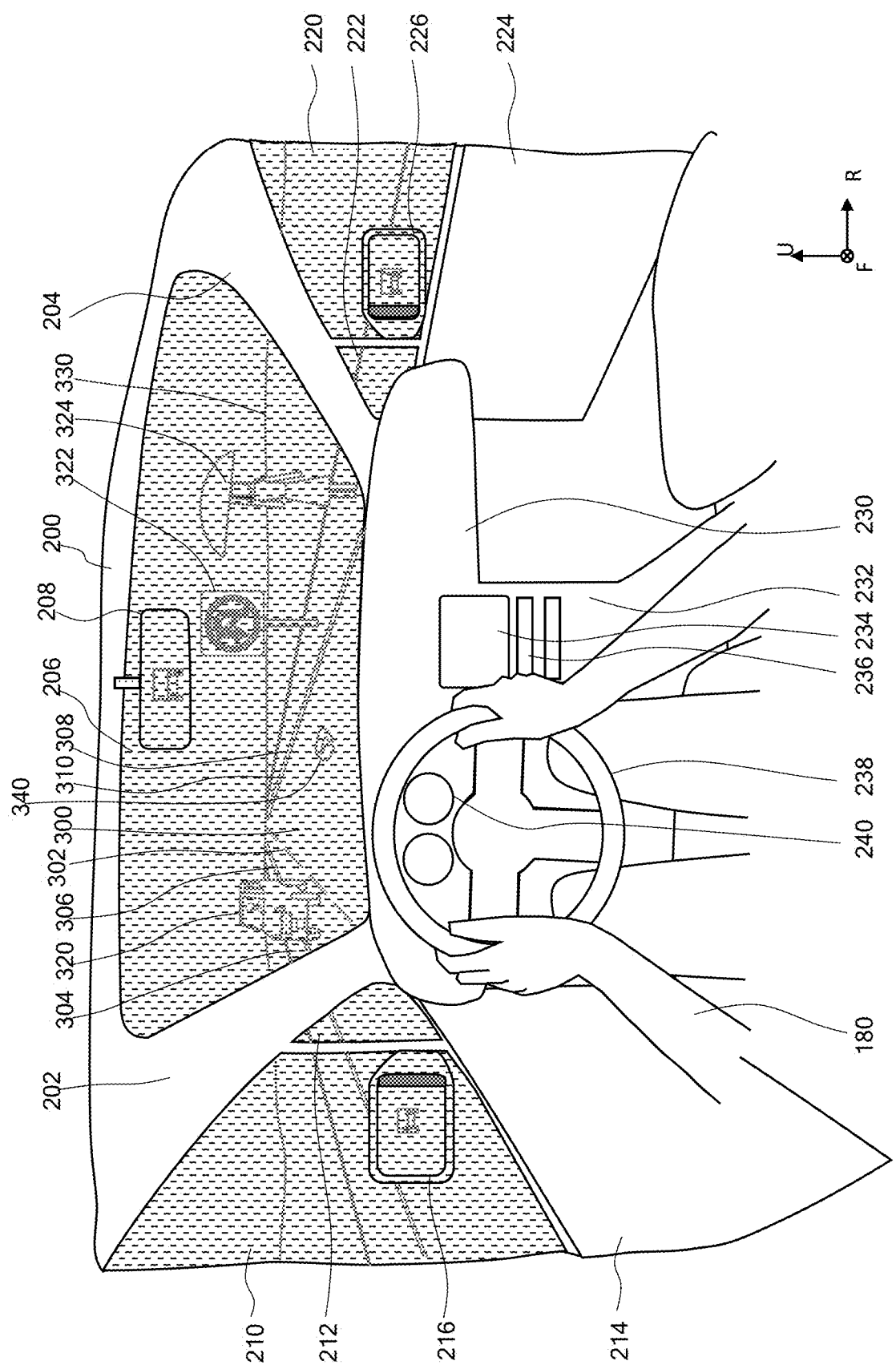
FIG. 8 is a diagram showing a field of view in rain with no image displayed.

Application of the event information in rainy weather is described below with reference to FIGS. 8 and 9, which corresponds to FIG. 5. In FIG. 8, the wearable device 150 displays no image, while in FIG. 9, the wearable device 150 displays an image.

Unlike in FIG. 5, the weather is assumed to be raining in FIG. 8. The outside view through the front windshield 206 and those through other windows are slightly unclear with rain. For example, the opposing vehicle 320, the road sign 322, and the pedestrian 324 are slightly more difficult to view than in FIG. 5. The centerline 302 and curbstones 306, 310 of the roadway 300 are also unclear. In the example shown in FIG. 8, an obstacle 340 is on the roadway 300 in the right lane.

Figure 9:
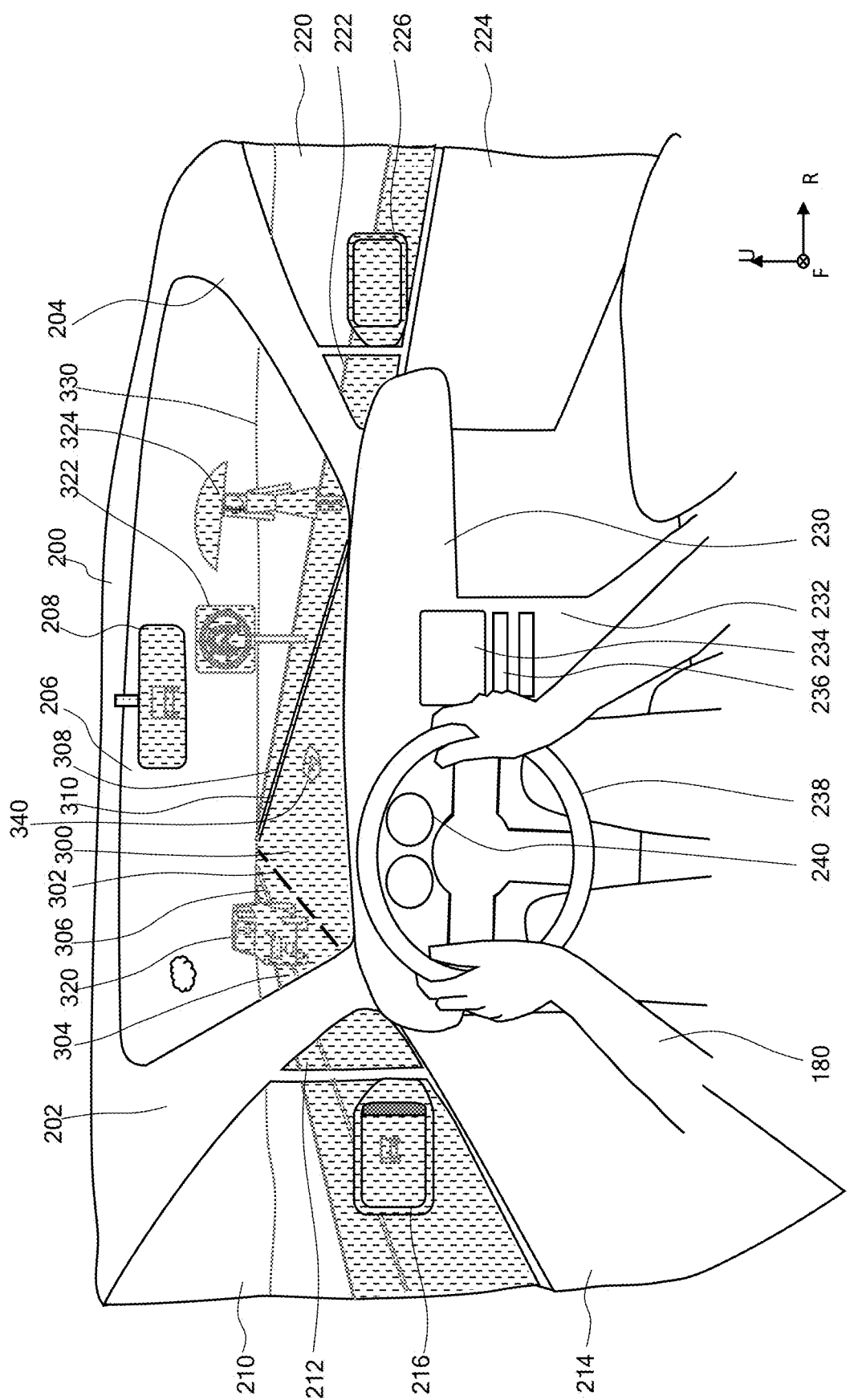
FIG. 9 is a diagram showing a field of view in rain with a displayed image of fine weather.

FIG. 9 shows a view with the wearable device 150 displaying an image based on the image data in fine weather 86, in the view shown in FIG. 8. The image in fine weather is basically applied to the view other than the road. A clear image in fine weather is shown in the sky above the skyline 330. The image in fine weather is displayed also on the ground on the left side of the left sidewalk 304 and on the right side of the right sidewalk 308. The displayed image is video which advances in accordance with the traveling location of the vehicle 100. The driver can clearly recognize the current traveling area.

In contrast, the image in fine weather is basically not displayed on the road. Specifically, no image is displayed on the road including the roadway 300, the left sidewalk 304, and the right sidewalk 308, the opposing vehicle 320, the road sign 322, and the pedestrian 324. Because the driver 180 sees actual views on these portions, the driver 180 can recognize the obstacle 340 on the roadway 300. Although not shown, no images are displayed for the portions of, for example, traffic lights, other vehicles on the right lane, and branch roads (with an intersection), if these exist. This accords with a policy to display no images for the portions that require current event information, in order to ensure safe driving.

However, in FIG. 9, the image in fine weather is displayed for the centerline 302 and the curbstones 310. This is to improve the safety of driving by clarifying the available lane in the right lane. In particular, because the illustrated right lane and the left lane for opposing vehicles are bordered only by the centerline 302, such clarification of the centerline 302 is advantageous for preventing a collision with an opposing vehicle. The illustrated right lane is next to the right sidewalk 308. Clarification of the curbstones 310 which serve as the border between the roadway 300 and the right sidewalk 308 is also advantageous for preventing a collision with a pedestrian.

When white lines or other techniques are used in place of or in addition to the curbstones 310 to define the driving lanes between the right sidewalk 308 and the roadway 300, images of the white lines or other techniques may be displayed in place of the curbstones 310. Further, when the roadway 300 is a two-lane road, the boundary of the road currently being driven may be clarified initially, and then the boundary of the other lane may be clarified in consideration of a possible lane change. In contrast, no clarification using images is performed for the curbstones 306 between the roadway 300 and the left sidewalk 304, because the curbstones 306 is not directly related to driving of the vehicle 100.

In the embodiment shown in FIG. 9, the centerline 302 and the curbstones 310 are the images of the corresponding portions in the camera image data which have been captured in the past, in other words, the images of the centerline 302 and the curbstones 310 are extracted from the camera image data. In order to display these images, the past images are displayed after performing image recognition to confirm that the current centerline 302 and the past centerline 302 are almost identical, and also that the current curbstones 310 and the past curbstones 310 are almost identical. This avoids displaying the past images of the centerline 302 when the centerline 302 is newly drawn and differs from the past images. Alternatively, when the centerline 302 is invisible because of snow, the past centerline 302 may be displayed without the confirmation of the match between the current centerline 302 and the past centerline 302.

When the obstacle 340 is on the centerline 302, the obstacle 340 is hidden by completely replacing the images. In such a case, in order to display the centerline 302 based on the images in fine weather, the images in fine weather may be made translucent and superimposed over the current centerline 302. Alternatively, because the centerline 302 and the curbstones 310 have relatively simple shapes, created virtual lines may be displayed in place of the images in fine weather.

At places where the right sidewalk 308 or the left sidewalk 304 is narrow or not provided, a pedestrian or a vehicle may suddenly appear to the roadway 300 from a building, a park, or a parking space beside the road. The area in which no past images are displayed may be slightly widened in relation to the road. Specifically, the area in which no past images are displayed may be set to include an area which is not on the road but beside the road and may affect traffic safety (hereinafter referred to as a "beside road view"). In a possible embodiment, the area within a predetermined distance (for example, within 3, 5, or 10 meters) from an edge of the road may be set as the area in which no past images are displayed, similarly to the road. When objects including buildings, such as a house or a shop, or a tree are in this area, it may be the case that no past images are displayed for lower portions (for example, lower than 2 or 3 meters from a road surface) of the objects. By virtue of this lack of display, while it is possible to view people currently getting in or out of a shop, the appearance of the shop including the billboard can also be clearly recognized by the image in fine weather.

In the embodiment shown in FIG. 9, no images are displayed over the road sign 322 such that the actual road sign 322 is visible. Similarly to the centerline 302 and other instances, when it is possible to confirm the meaning of the road sign 322 through image recognition, an image of the road sign 322 which has been prepared in advance may be displayed. This enables the driver 180 to view the road sign 322 clearly.

An embodiment to display the past view data 84 is described below with reference to FIG. 10. FIG. 10 shows a view switched from the one in FIG. 5, based on the camera image data captured in the area five years ago. In this area, no buildings or other structures existed around the roadway 300 five years ago. However, a small hill 410 is spread and trees 412 exist ahead. In FIG. 10, the view excluding the road is replaced with the camera image data captured five years ago. The display is performed with video which follows the movement of the vehicle 100. When the past camera image data are displayed, the driver 180 may feel discomfort if the current images and the past images fail to correspond to each other significantly. Adjustment may be performed to align the past images to the current images at relatively high accuracy.

In FIG. 10, no past images are displayed on the roadway 300, the left sidewalk 304, the right sidewalk 308, the opposing vehicle 320, the road sign 322, and the pedestrian 324; in other words, the portions of road view. This is in consideration of traffic safety, as described above regarding FIG. 9. In FIG. 10, no past images may be displayed for the beside road view.

An embodiment to display the future virtual data 90 is described below with reference to FIG. 11. FIG. 11 shows a view switched from the one in FIG. 5. FIG. 11 shows a view which is expected in this area in five years in the future. In this area, an airport is currently under construction. The small hill 410 which existed five years ago has been removed to prepare ground for construction. The airport is planned to be opened in three years.

In FIG. 11, the view excluding the road is replaced with a virtual image based on video data which have been created by expecting the view after the opening of the airport. Specifically, buildings including a control tower 420 of the airport and an airplane 422 departing from the airport are displayed. In contrast, no images based on the future virtual data 90 are displayed on the road and the beside road view, in order to place priority on ensuring traffic safety. The future virtual data 90 enable the driver 180 to enjoy future views and recognize a future development plan.

When the future virtual data 90 pertain to a specific construction, such as a building, the view can become more realistic by showing the construction at an actual location where the construction will be built. However, as it is generally impossible to accurately determine the location of a future object or an occurrence of an event, including the location of constructions, an accurate display is not always required. Even not so accurate images may be sufficient to provide reality to the driver 180 so long as the images change in correspondence to the movement of the vehicle 100 when the vehicle 100 travels forward, accelerates, or turns.

In the above description, embodiments with images displayed through the wearable device 150 which the driver 180 wears are described as examples. Similarly, various displays may be possible through the wearable device 150 when an occupant other than the driver 180 wears the wearable device 150.

FIG. 12 shows an embodiment in which the vehicle 100 drives in an autonomous driving mode. An occupant 190 behind the wheel is not responsible for driving. The occupant 190 does not operate the steering wheel 238.

FIG. 12 shows a view displayed through the wearable device 150 switched by the occupant 190 from the view shown in FIG. 5 to a past virtual video. In this embodiment, this area is assumed to be famous as a battlefield between troops led by two prominent commanders 400 years ago. As the past virtual data 88, video data are created to reproduce battle scenes.

FIG. 12 shows the above described video through the front windshield 206, the left-front side window 210, the left triangular quarter window 212, the right-front side window 220, and the right triangular quarter window 222, using the entire respective windows. Specifically, the small hill 410 which existed five years ago, and many trees 430 are displayed far ahead. Warriors 432 of a unit led by one of the two commanders are shown on the right side. Each warrior carries a flag on the back and holds a matchlock weapon at the ready. Fences 434 are provided in front of the warriors 432 to stop advance of battle horses. A horse 436 on which a warrior of a unit led by the other commander rides is shown on the left side. The horse 436 is taking the lead and has started the attack.

The displayed images are not just a drama, but the viewpoint moves in accordance with the movement of the vehicle 100. In the example shown in FIG. 12, more warriors further ahead become visible one after another as the vehicle 100 travels further. It should be noted that the actual vehicle speed and the moving speed of the warriors in the images do not have to completely match each other. It would be sufficient if the moving speed of the warriors corresponds to the movement of the vehicle 100. As the vehicle 100 travels further, the images are changed to show close combat in which the troops fight using spears and swords. The image data are created to show the prominent commander in armor on the way. The occupant 190 can enjoy the past event in the video through the wearable device 150. Voices and sounds corresponding to the video may also be output to make the video more realistic.

In the embodiment shown in FIG. 12, the images are shown only in the front windshield 206, the left-front side window 210, the left triangular quarter window 212, the right-front side window 220, and the right triangular quarter window 222. This is to make the occupant 190 realize that the occupant 190 is traveling in the vehicle 100, while enjoying the images. Further, the occupant 190 may feel relief by knowing that the occupant 190 can operate the touch panel 234 and operation buttons 236, and by confirming that the steering wheel 238 and the meters and gauges 240 are provided, with no images displayed on these portions. However, in order to place priority on the image display, images may also be displayed on, for example, the left A-pillar 202 and the right A-pillar 204, and further on the roof 200, and the instrument panel 230.

In the embodiment shown in FIG. 12, the entire road view including the roadway 300 is replaced with the past virtual data 88. This is because, in the autonomous driving mode, the occupant 190 is not responsible for driving the vehicle 100, and the occupant 190 does not need to pay attention outside the vehicle 100 for driving. For the occupant 190, other than the driver 180, images can be displayed over the road view and beside road view. This is not limited to the display of the past virtual data 88 shown in FIG. 12. In the embodiments shown in FIGS. 5 to 11, images may be displayed without a need to consider traffic safety. For occupants in rear seats or passengers on a bus, images may be displayed to overlap not only the windshield and windows but also other portions, because their fields of view are narrower than that of the occupant in a front seat.

The present disclosure may take various other embodiments. For example, a display system according to the present disclosure may include an information obtaining unit configured to obtain event information about a past or future event inside the field of view of an occupant of a vehicle and associate the obtained event information with the location of the event. The display system may also include a range obtaining unit configured to obtain a field of view of the occupant of the vehicle, and a display unit that displays the event in the field of view of the occupant when the location of the event information is within the field of view.

The invention claimed is:

1. A display system comprising:
a receiver configured to obtain event information about an event in the past or future located within a field of view of an occupant of a vehicle; and
a wearable device comprising an electro luminescence display inside a rim of the wearable device configured to display the event within the field of view of the occupant based on the obtained event information, wherein:
the rim of the wearable device comprises a mechanical button,
the receiver obtains, as the event information, vehicle outside view image data captured by a vehicle which has traveled in the past,
the electro luminescence display displays text data or a symbol to indicate an outline, and
operation of the mechanical button causes the electro luminescence display to adjust the obtained image data to correspond to a traveling location of the vehicle with the occupant and display the event based on the adjusted image data.

2. The display system according to claim 1, wherein the occupant is a driver, and
the electro luminescence display is configured to display a corresponding view by overlapping or replacing an actual view excluding a road.

3. The display system according to claim 1, wherein the occupant is not a driver, and
the electro luminescence display is configured to display a corresponding view by overlapping or replacing an actual view including a road.

4. The display system according to claim 1, wherein
the receiver is configured to obtain the image data captured in the past in fine or cloudy weather when current weather around the vehicle with the occupant is rain or snow, and
the electro luminescence display is configured to display a centerline based on the image data by overlapping or replacing an actual centerline.

5. A display system comprising:
a receiver configured to obtain event information about an event in the past or future located within a field of view of an occupant of a vehicle; and
a wearable device comprising an electro luminescence display inside a rim of the wearable device configured to display the event within the field of view of the occupant based on the obtained event information, wherein:
the rim of the wearable device comprises a mechanical button,
the receiver obtains, as the event information, past traffic accident information,
the electro luminescence display displays text data or a symbol to indicate an outline, and
operation of the mechanical button causes the electro luminescence display to display an event of the traffic accident with a clear indication of a location of the traffic accident.

6. A display system comprising:
a receiver configured to obtain event information about an event in the past or future located within a field of view of an occupant of a vehicle; and
a wearable device comprising an electro luminescence display inside a rim of the wearable device configured to display the event within the field of view of the occupant based on the obtained event information, wherein the rim of the wearable device comprises a mechanical button:
the receiver obtains, as the event information, image data which have been created about an event assumed to have occurred in the past,
the electro luminescence display displays text data or a symbol to indicate an outline, and
operation of the mechanical button causes the electro luminescence display to adjust the obtained image data to correspond to a traveling location of the vehicle with the occupant and display the event based on the adjusted image data.

7. The display system according to claim 6, wherein the occupant is a driver, and
the electro luminescence display is configured to display a corresponding view by overlapping or replacing an actual view excluding a road.

8. The display system according to claim 6, wherein the occupant is not a driver, and
the electro luminescence display is configured to display a corresponding view by overlapping or replacing an actual view including a road.

9. A display system comprising:
a receiver configured to obtain event information about an event in the past or future located within a field of view of an occupant of a vehicle; and
a wearable device comprising an electro luminescence display inside a rim of the wearable device configured to display the event within the field of view of the occupant based on the obtained event information, wherein the rim of the wearable device comprises a mechanical button:
the receiver obtains, as the event information, virtual image data which have been created about an event assumed to occur in the future,
the electro luminescence display displays text data or a symbol to indicate an outline, and
operation of the mechanical button causes the electro luminescence display to adjust the obtained image data to correspond to a traveling location of the vehicle with the occupant and display the event based on the adjusted image data.

10. The display system according to claim 9, wherein the occupant is a driver, and
the electro luminescence display is configured to display a corresponding view by overlapping or replacing an actual view excluding a road.

11. The display system according to claim 9, wherein the occupant is not a driver, and
the electro luminescence display is configured to display a corresponding view by overlapping or replacing an actual view including a road.

* * * * *